(12) United States Patent
Tsuruta et al.

(10) Patent No.: US 9,865,851 B2
(45) Date of Patent: Jan. 9, 2018

(54) BATTERY MODULE

(71) Applicant: GS Yuasa International Ltd., Kyoto-shi (JP)

(72) Inventors: Shogo Tsuruta, Kyoto (JP); Masamitsu Tononishi, Kyoto (JP); Ryutaro Nishikawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 58 days.

(21) Appl. No.: 14/244,791

(22) Filed: Apr. 3, 2014

(65) Prior Publication Data

US 2014/0302364 A1  Oct. 9, 2014

(30) Foreign Application Priority Data

Apr. 8, 2013  (JP) ................................ 2013-080629

(51) Int. Cl.
*H01M 10/42* (2006.01)
*H01M 2/10* (2006.01)
(Continued)

(52) U.S. Cl.
CPC ....... *H01M 2/1094* (2013.01); *H01M 2/1061* (2013.01); *H01M 2/1077* (2013.01); *H01M 2/202* (2013.01); *H01M 2/206* (2013.01); *H01M 2/20* (2013.01); *H01M 2/204* (2013.01); *H01M 2/208* (2013.01); *H01M 2/22* (2013.01); *H01M 2/24* (2013.01); *H01M 2/26* (2013.01); *H01M 2/266* (2013.01)

(58) Field of Classification Search
CPC . H01M 2/1094; H01M 2/1077; H01M 2/1061
See application file for complete search history.

(56) References Cited

U.S. PATENT DOCUMENTS

2006/0275658 A1  12/2006 Sanada
2008/0318119 A1*  12/2008 Watanabe ........... B60L 11/1874
429/99
(Continued)

FOREIGN PATENT DOCUMENTS

| CN | 101952924 A | 1/2011 |
| JP | 2005-222699 A | 8/2005 |

(Continued)

OTHER PUBLICATIONS

European Search Report dated Aug. 29, 2014.
(Continued)

*Primary Examiner* — Ula C Ruddock
*Assistant Examiner* — Matthew Van Oudenaren
(74) *Attorney, Agent, or Firm* — McGinn IP Law Group, PLLC

(57) ABSTRACT

A battery module has a cell unit including battery cells, a positive external terminal electrically connected to a positive side of the battery cells through a positive electro conductive member, and a negative external terminal electrically connected to a negative side of the battery cells. The positive electro conductive member extends a first surface which is one of surfaces of the cell unit. The negative electro conductive member extends of a second surface which is one of surfaces of the cell unit other than the first surface.

18 Claims, 5 Drawing Sheets

(51) Int. Cl.
  *H01M 2/26* (2006.01)
  *H01M 2/20* (2006.01)
  *H01M 2/24* (2006.01)
  *H01M 2/22* (2006.01)

(56) References Cited

U.S. PATENT DOCUMENTS

2010/0255351 A1* 10/2010 Ijaz .................... H01M 2/1077
                                                          429/7
2012/0270097 A1   10/2012 Yasui et al.

FOREIGN PATENT DOCUMENTS

| JP | 2005-222703 A | 8/2005 |
| JP | 2006-339031 A | 12/2006 |
| JP | 2007-12487 A | 1/2007 |
| JP | 2007-059088 A | 3/2007 |
| JP | 2010-097722 A | 4/2010 |
| JP | 2012-113854 A | 6/2012 |
| JP | 2014-017190 A | 1/2014 |
| JP | 2014-089840 A | 5/2014 |
| WO | WO 2010/081086 A1 | 7/2010 |
| WO | WO 2012/081140 A1 | 6/2012 |
| WO | WO 2013/021538 A1 | 2/2013 |

OTHER PUBLICATIONS

Japanese Office Action dated Feb. 7, 2017, with a partial English translation.
Chinese Office Action dated Jun. 2, 2017, with an English translation.

* cited by examiner

BATTERY MODULE

CROSS-REFERENCE TO RELATED APPLICATIONS

This application claims priority of Japanese Patent Application No. 2013-080629 filed on Apr. 8, 2014, the content of which is incorporated herein by reference.

FIELD

The present invention relates to a battery module.

BACKGROUND

A conventional battery module is disclosed in JP 2010-97722 A. The battery module includes a cell unit including a plurality of battery cells arranged in a first direction, a positive external terminal electrically connected to a positive side of the plurality of battery cells through a positive electro conductive member, and a negative external terminal electrically connected to a negative side of the plurality of battery cells through a negative electro conductive member.

The above cell unit has a cell terminal surface on which terminals of the battery cells are respectively located. On the cell electro surface, the positive electro conductive member and negative electro conductive member are respectively connected to the positive external terminal and negative external terminal.

In the above conventional battery module, the positive electro conductive member and negative electro conductive member are positioned on the same cell terminal surface of the cell unit. This causes short circuit between the positive electro conductive member and negative electro conductive member when the cell unit is crushed due to external impact or when a metal part around the cell unit contacts both of the positive electro conductive members and negative electro conductive members in a bridging manner.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a battery module in which the possibility of short circuit between a positive electro conductive member and a negative electro conductive member can be decreased.

One aspect of the present invention provides a battery module comprising, a cell unit including a plurality of battery cells arranged in a first direction, a positive external terminal electrically connected to a positive side of the plurality of battery cells through a positive electro conductive member, and a negative external terminal electrically connected to a negative side of the plurality of battery cells through a negative electro conductive member. The cell unit has a plurality of surfaces. The positive electro conductive member extends on a first surface which is one of the plurality of surfaces of the cell unit. The negative conductive member extends on a second surface which is one of the plurality of surfaces of the cell unit other than the first surface.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

Figure 1:
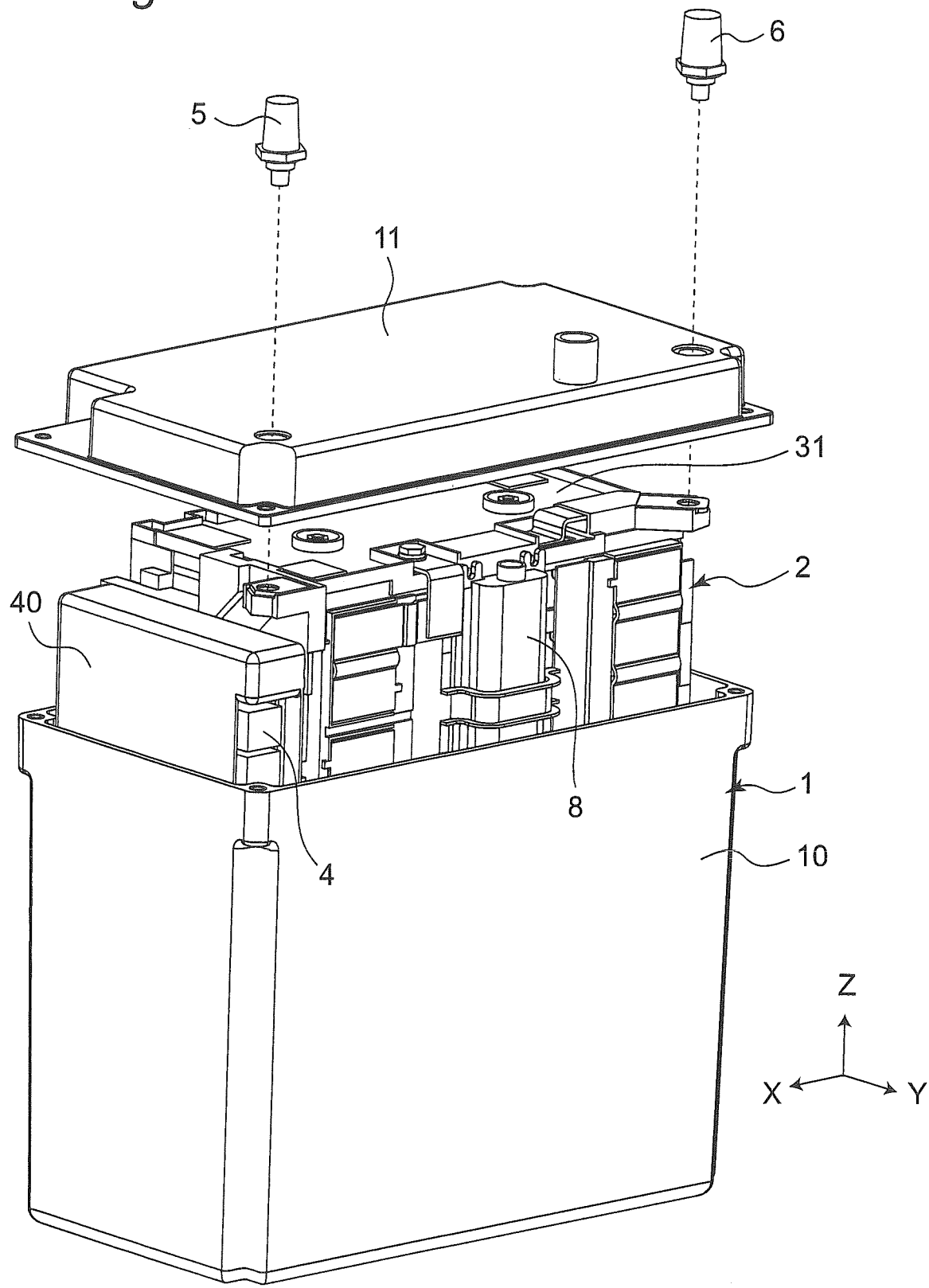
FIG. 1 is a perspective view of a battery module according to an embodiment of the present invention.

One aspect of the present invention provides a battery module comprising, a cell unit including a plurality of battery cells arranged in a first direction, a positive external terminal electrically connected to a positive side of the plurality of battery cells through a positive electro conductive member, and a negative external terminal electrically connected to a negative side of the plurality of battery cells through a negative electro conductive member. The cell unit has a plurality of surfaces. The positive electro conductive member extends on a first surface which is one of the plurality of surfaces of the cell unit. The negative conductive member extends on a second surface which is one of the plurality of surfaces of the cell unit other than the first surface.

According to the battery cell of the present invention, the positive electro conductive member extends on the first surface of the plurality of surfaces of the cell unit and the negative electro conductive member is extends on the second surface other than the first surface.

Since the positive electro conductive member and the negative electro conductive member extend on the different surfaces, the short circuit between the positive electro conductive member and the negative electro conductive member can be reliably prevented even when the cell unit is crushed due to external impact or when a metal part contacts the cell unit.

In an embodiment of the battery module, the first and second surfaces cross with each other.

According to the battery module of the embodiment, since the first surface and the second surface cross with each other, the positive electro conductive member and the negative electro conductive member extend in directions crossing with each other, resulting in that a short circuit can be reliably prevented.

In an embodiment of the battery module, the positive external terminal and the negative external terminal are arranged on the first surface or the second surface.

According to the battery module of the embodiment, since the positive external terminal and the negative external terminal are arranged on the first surface or the second surface, a length of the positive electro conductive member or the negative electro conductive member can be reduced.

In an embodiment of the battery module, the positive electro conductive member has at least one corner portion on the first surface.

According to the battery module of the embodiment, since the electro conductive member has at least one corner portion on the first surface, a space on the first surface can be effectively used. In addition, flexibility of a layout of components on the first surface is enhanced. Further, the positive electro conductive member can be formed so as to keep much distance from the negative electro conductive member, resulting in that the short circuit between the positive electro conductive member and the negative electro conductive member can be more reliably prevented.

In an embodiment of the battery module, the negative electro conductive member has at least one corner portion on the second surface.

According to the battery module of the embodiment, since the negative conductive member has at least one corner portion on the second surface, a space on the second surface can be effectively used. In addition, flexibility of a layout of components on the second surface is enhanced. Further, the negative conductive member can be made to escape from the positive conductive member, resulting in that the short circuit between the positive electro conductive member and the negative electro conductive member can be more reliably prevented.

An embodiment of the battery module includes a groove into which at least one of the positive electro conductive member and the negative electro conductive member is fitted.

According to the battery module of the embodiment, the groove, into which at least one of the positive electro conductive member and the negative electro conductive member is fitted, is fog med. This allows the positive electro conductive member to be easily guided to the second surface at assembling work.

According to the battery module of the present invention, the positive electro conductive member extends on the first surface and the negative electro conductive member extends on the second surface other than the first surface. This results in that the short circuit can be reliably prevented.

Hereinafter, the present invention will be described in detail with reference to an illustrated embodiment.

FIG. 1 is a perspective view illustrating a battery module according to an embodiment of the present invention. As illustrated in FIG. 1, the battery module includes a case 1, a cell unit 2 accommodated in the case 1, and a battery monitoring element 4 accommodated in the case 1.

The case 1 includes a body 10 having an opening and a lid 11 attached to the body 10 so as to close the opening. Arranged outside of the case 1 are a positive external terminal 5 and a negative external terminal 6. The positive and negative external terminal 5 and the negative terminal 6 extend through the lid 11 to be electrically connected to the cell unit 2. The battery monitoring element 4 is attached to the cell unit 2. The battery monitoring element 4 is covered by a cover 40.

Figure 2:
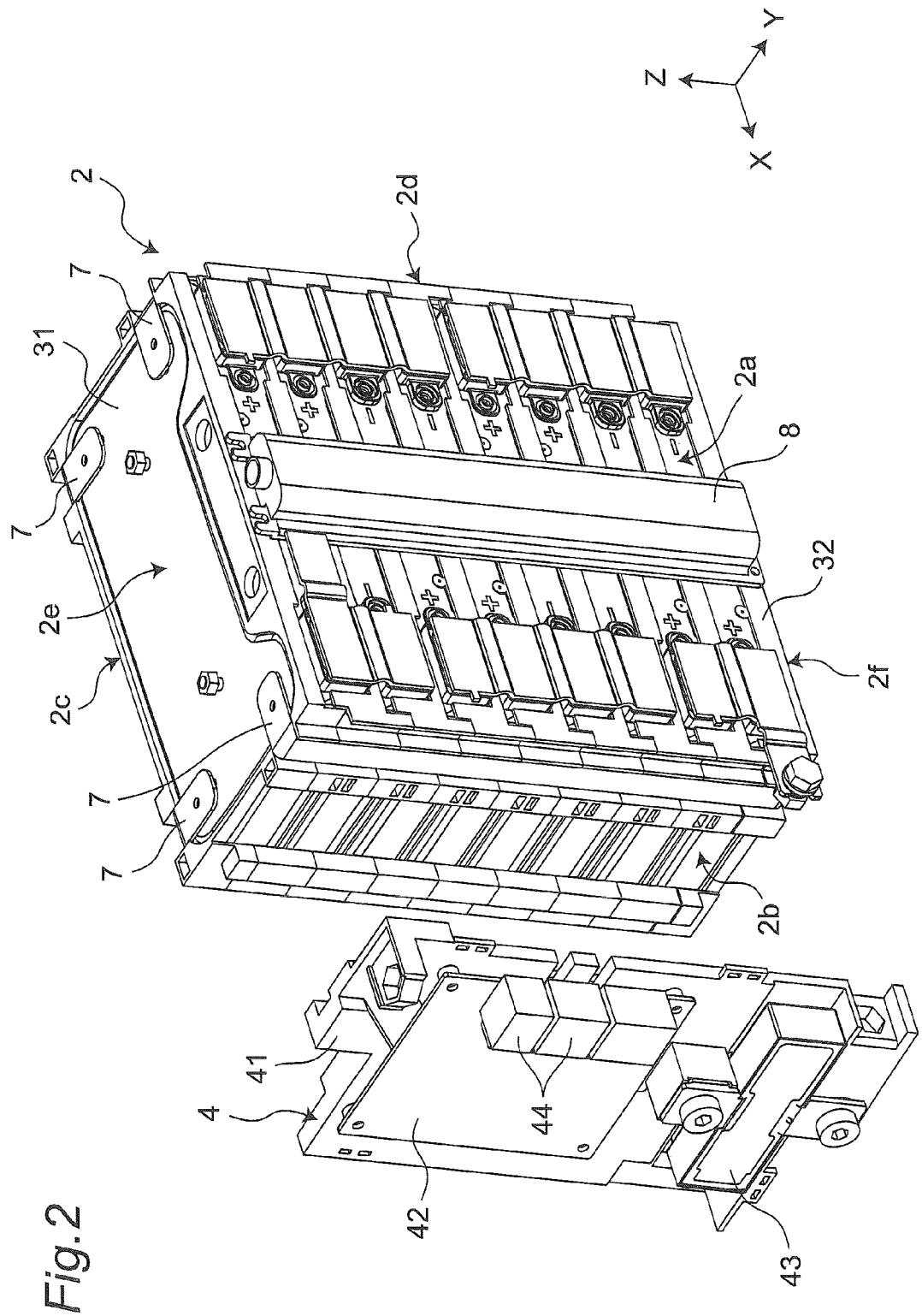
FIG. 2 is an exploded perspective view of a cell unit and a battery monitoring element.
Figure 3:
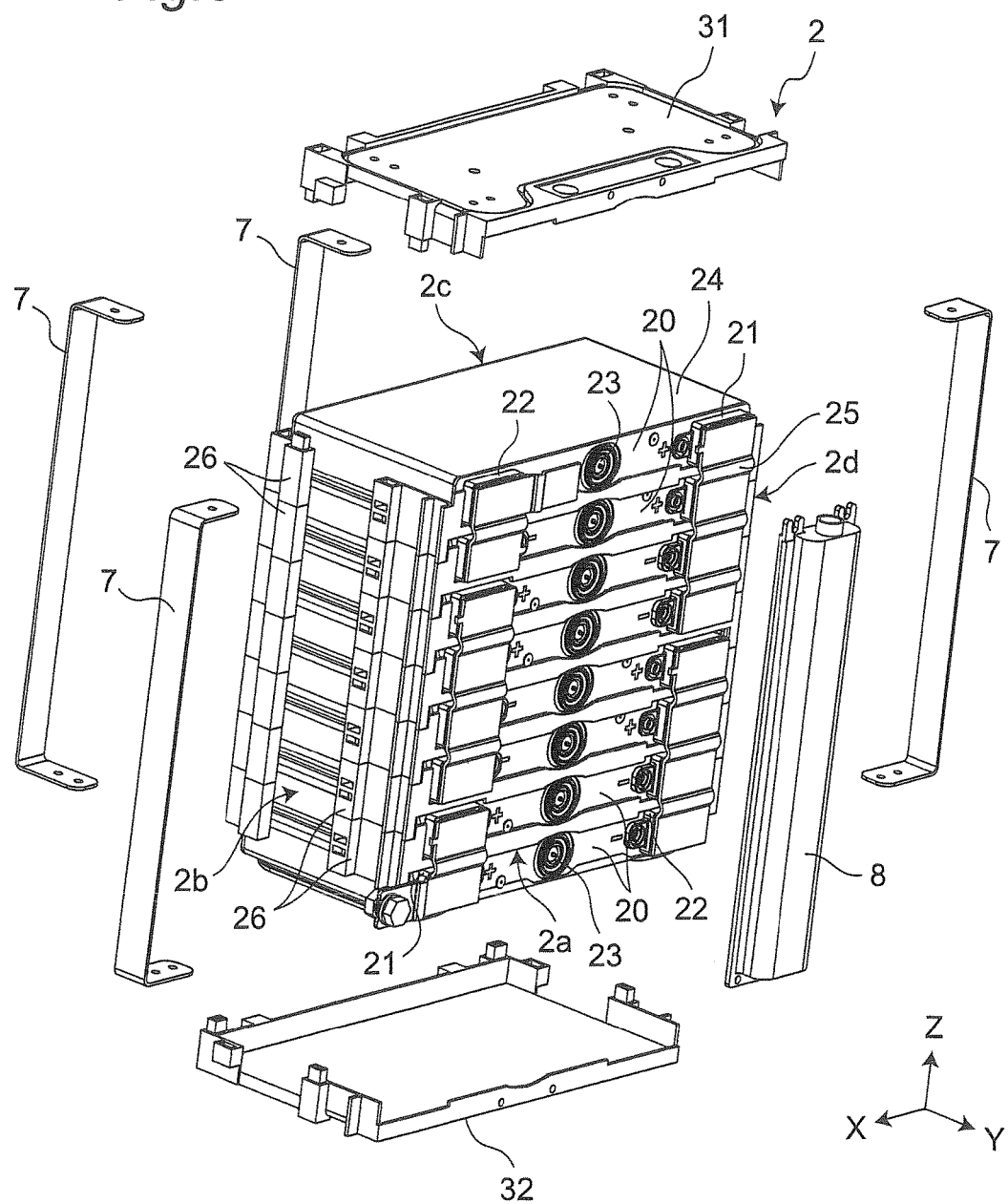
FIG. 3 is an exploded perspective view of the cell unit.

As illustrated in FIGS. 2 and 3, the cell unit 2 includes eight battery cells 20 arranged in a first direction (Z-direction). Spacers 26 are respectively interposed between the battery cells adjacent to each other.

The battery cell 20 is each, for example, a non-aqueous electrolyte secondary battery. The battery cell 20 includes a sealed vessel 24 and a power generation element accommodated in the sealed vessel 24. The power generation element has a positive electrode plate, a negative electrode plate, and separators interposed between the positive electrode plate and the negative electrode plate. A lid of the sealed vessel 24 is provided with a positive terminal 21 and a negative terminal 22 respectively being exposed to the outside. The positive terminal 21 and positive electrode plate, as well as negative terminal 22 and negative electrode plate, are electrically connected through a current collector disposed in the sealed vessel 24.

The lid of the sealed vessel 24 is provided with a safety valve 23 arranged at a position between the positive terminal 21 and the negative terminal 22. When a pressure of gas generated in the sealed vessel 24 reaches above a predetermined value, the safety valve 23 releases the gas out of the sealed vessel 24. The safety valves 23 of the battery cells 20 are covered by an exhaust tube 8 extending in the first direction.

The first to eighth battery cells 20 are arranged in line from one side in the first direction toward (upper side in the drawing) to the other side in the first direction (lower side in the drawing). The first and second battery cells 20 are placed so that the respective positive terminals 21 are aligned on the right side in the drawing. The third and fourth battery cells 20 are placed so that the respective positive terminals 21 are aligned on the left side in the drawing. The fifth and sixth battery cells 20 are placed so that the respective positive terminals 21 are aligned on the right side in the drawing. Further, the seventh and eighth battery cells 20 are placed so that the respective positive terminals 21 are aligned on the left side in the drawing.

A pair of the first and second battery cells 20, a pair of the third and fourth battery cells 20, a pair of the fifth and sixth battery cells 20, and a pair of the seventh and eighth battery cells 20 are respectively electrically connected in series via bus bars 25. A positive side of the plurality of battery cells 20 connected in series in that way (a positive terminal of the cell unit 2) is electrically connected to the positive external terminal 5 via a positive electro conductive member 51 (see FIG. 4), while a negative side of the serially connected plurality of battery cells 20 (a negative terminal of the cell unit 2) is electrically connected to the negative external terminal 6 via a negative electro conductive member 52 (see FIG. 4).

The cell unit 2 has a first end plate 31 and a second end plate 32. The first end plate 31 is arranged on the one side of the plurality of battery cells 20 in the first direction. The second end plate 32 is arranged on the other side of the plurality of battery cells 20 in the first direction. The plurality of battery cells 20 are sandwiched by the first and second end plates 31 and 32.

The cell unit 2 has four side surfaces around its periphery with respect to the first direction. The four side surfaces include a first side surface 2a, a second side surface 2b, a third side surface 2c, and a fourth side surface 2d, which are arranged sequentially in a peripheral direction with respect to the first direction. The first side surface 2a is a surface where the safety valves 23, positive terminals 21, and negative terminals 22 of the battery cell 20 are located.

The plurality of battery cells 20, the first end plate 31, and the second end plate 32 are bound together by four metal binding bands 7. The binding bands 7 extend in the first direction and are coupled with the first and second end plates 31 and 32. One binding bands 7 is provided for each of the second and fourth side surfaces 2b and 2d, and two binding bands 7 are provided for the third side surfaces 2c.

The battery monitoring element 4 monitors a state of each battery cell 20. The battery monitoring element 4 includes a resin base 41, a control board 42 arranged on one surface of the base 41, a breaker 43, and a connector 44. The control board 42 controls input current to the battery cell 20 as well as output current from the battery cell 20. The breaker 43 prevents inflow of high current from the battery cell 20. The connector 44 is electrically connected to, e.g., an external terminal of a vehicle. The base 41 is attached to the second side surface 2b of the cell unit 2.

Figure 4:
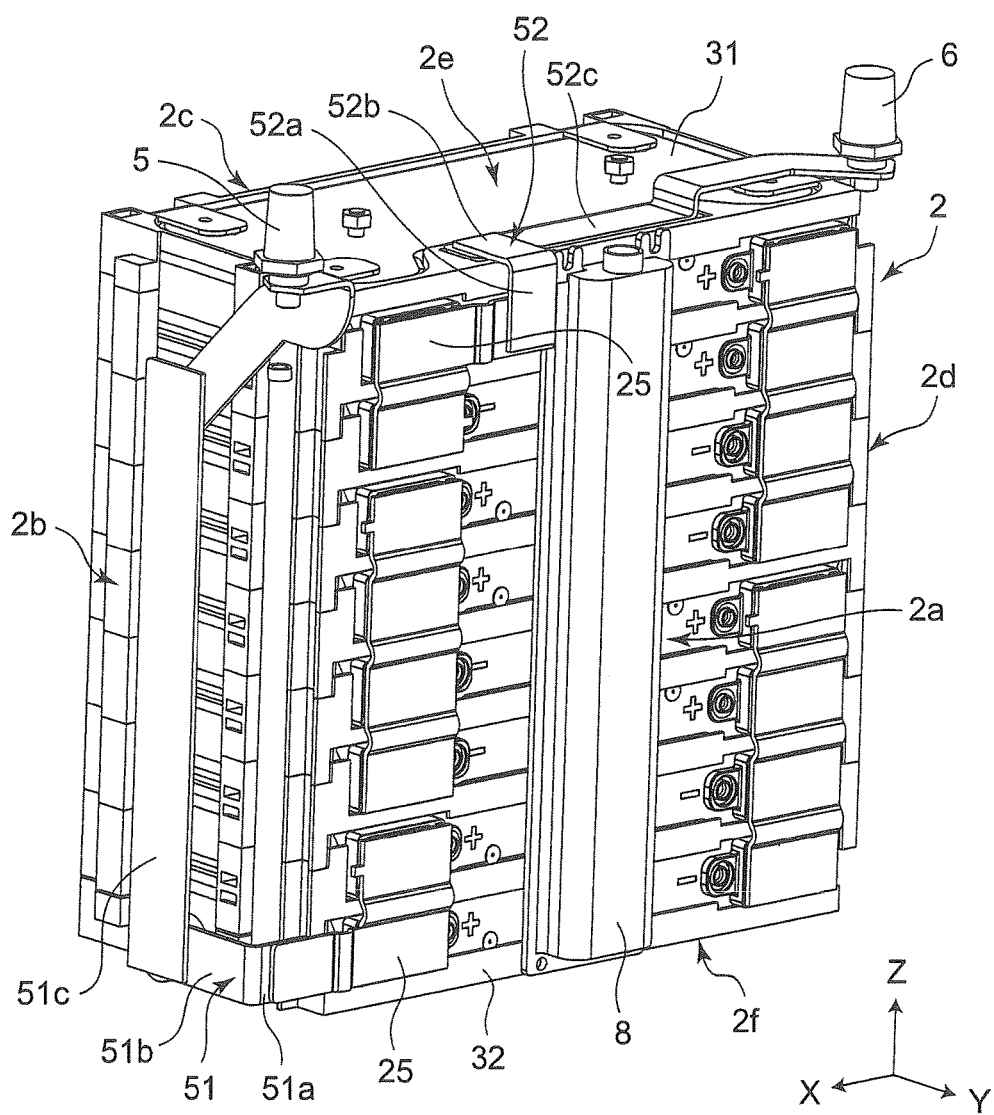
FIG. 4 is a perspective view of the sell unit of combined status.

As illustrated in FIG. 4, the cell unit 2 has, at both ends thereof in the first direction, a first end surface 2e and a second end surface 2f. The first end surface 2e is an end surface of the first end plate 31, and the second end surface 2f is an end surface of the second end plate 32. The first end surface 2e is a surface where the positive and negative external terminals 5 and 6 are arranged.

The positive electro conductive member 51 is arranged on the second side surface 2b of the cell unit 2. The negative electro conductive member 52 is arranged on the first end surface 2e of the cell unit 2.

The positive electro conductive member 51 includes a first part 51a, a second part 51b, and a third part 51c. The first part 51a is arranged on the first side surface 2a. The second part 51b extends so as to bend from the first part 51a to the second side surface and is arranged on the second side surface 2b. The third part 51c extends from the second part 51b so as to be bent in a peripheral direction with respect to a direction perpendicular to the second side surface 2b. That is, as viewed in the direction perpendicular to the second side surface 2b, the positive electro conductive member 51 has one corner portion corresponding to a connection part between the second part 51b and third part 51c.

The first part 51a is connected to the positive side of the plurality of battery cells 20 via the bus bars 25. The third part 51c is connected to the positive external terminal 5. The first part 51a, second part 51b, and third part 51c may be either integrally formed or separately form. In the latter case, the first to third parts 51a to 51c may be fixed to one another by welding or by using bolts. The third part 51c may be an electro conductive member having an L-shaped cross section and arranged along a corner portion of the cell unit 2.

The negative electro conductive member 52 has a first part 52a, a second part 52b, and a third part 52c. The first part 52a is arranged on the first side surface 2a. The second part 52b extends so as to bend from the first part 52a and is arranged on the first end surface 2e. The third part 52c extends so as to bend from the second part 52b in a peripheral direction with respect to a direction perpendicular to the first end surface 2e. That is, as viewed in the direction perpendicular to the first end surface 2e, the negative electro conductive member 52 has one corner portion corresponding to a connection part between the second part 52b and third part 52c on the first end surface 2e.

The first part 52a is connected to the negative side of the plurality of battery cells 20 through the bus bars 25. The third part 52c is connected to the negative external terminal 6. The first part 52a, second part 52b, and third part 52c may be either integrally formed or separately formed. In the latter case, the first to third parts 52a to 52c may be fixed to one another by welding or by using bolts. The third part 52c may be an electro conductive member having an L-shaped cross section and arranged along a corner portion of the cell unit 2.

Figure 5:
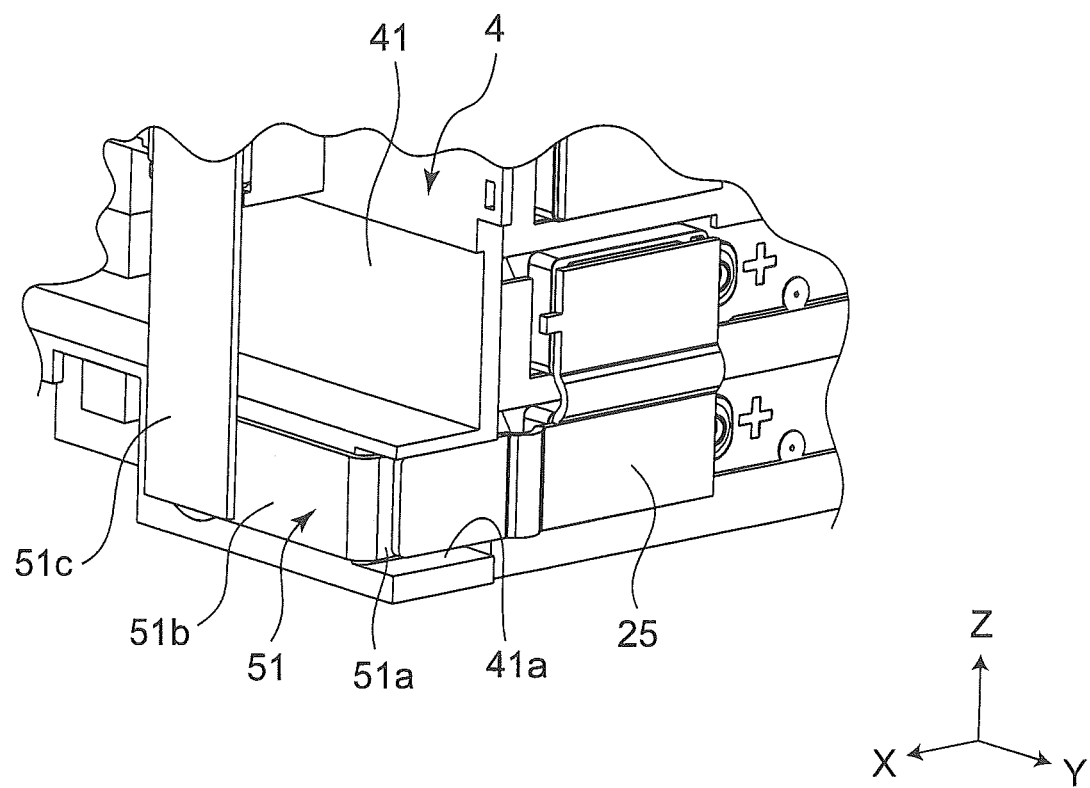
FIG. 5 is an enlarged view of the battery module.

As illustrated in FIG. 5, the base 41 of the battery monitoring element 4 is formed with a groove 41a into which the positive electro conductive member 51 is fitted. Specifically, the first part 51a of the positive electro conductive member 51 is fitted into the groove 41a of the base 41 together with the bus bar 25.

According to the battery module having the above configuration, the positive electro conductive member 51 extends on the second side surface 2b of the cell unit 2 other than the first side surface 2a. The negative electro conductive member 52 extends on the first end surface 2e of the cell unit 2 other than the first side surface 2a and second side surface 2b.

Thus, since the positive electro conductive 51 and the negative electro conductive member 52 extend on the different surfaces, the short circuit between the positive electro conductive member 51 and the negative electro conductive member 52 can be reliably prevented even when the cell unit 2 is crushed due to external impact or when a metal part contacts the cell unit 2.

Further, since the second side surface 2b and first end surface 2e cross with each other, the positive electro conductive member 51 and negative electro conductive member 52 extend in directions crossing with each other, resulting in that the short circuit can be reliably prevented.

Since the positive and negative external terminals 5 and 6 are arranged on the first end surface 2e, a length of the negative conductive member 52 can be reduced. The positive and negative external terminals 5 and 6 may be arranged on the second side surface 2b. In this case, a length of the positive electro conductive member 51 can be reduced.

Since the positive electro conductive member 51 has at least one corner portion on the second side surface 2b, a space on the second side surface 2b can be effectively used. In addition, flexibility of a layout of components on the second side surface 2b is enhanced. Further, the positive electro conductive member 51 can be formed so as to keep much distance from the negative electro conductive member 52, resulting in that the short circuit between the positive electro conductive member 51 and negative electro conductive member 52 can be more reliably prevented.

Further, since the negative conductive member 52 has at least one corner portion on the first end surface 2e, a space on the first end surface 2e can be effectively used. In addition, flexibility of a layout of components on the first end surface 2e is enhanced. Further, the negative conductive member 52 can be formed so as to keep much distance from the positive conductive member 51, resulting in that the short circuit between the positive electro conductive member 51 and the negative electro conductive member 52 can be more reliably prevented.

Further, the groove 41a into which the positive electro conductive member 51 is fitted allows the positive conductive member 51 to be easily guided to the second side surface 2b at assembling work.

The present invention is not limited to the above embodiment. For example, the number of the battery cells may be increased or decreased as desired.

In the above embodiment, the positive electro conductive member extends on the second side surface, whereas the negative electro conductive member extends on the first end surface. However, the positions of the positive electro conductive member and negative electro conductive member bar may be reversed. Further, the positive electro conductive member may extend on a first surface other than the first side surface, and negative electro conductive member may extend on a second surface other than the first side surface or the first surface. Further, positions of the positive and negative external terminals may be reversed. Further, one of the positive and negative electro conductive members may extend on the first side surface.

The positive electro conductive member may have at least one corner portion on the second side surface, and the negative electro conductive member may to have at least one corner portion on the first end surface. Further, only any one of the positive and negative electro conductive members may have the corner portion.

Although the groove for fitting of the positive electro conductive member therein is provided in the above embodiment, the groove for fitting of the negative electro conductive member therein may be provided.

What is claimed is:

1. A battery module comprising:
   a cell unit including a plurality of battery cells arranged in a first direction;
   a plurality of bus bars;
   a positive external terminal electrically connected to a positive side of the plurality of battery cells through a positive electro conductive member; and
   a negative external terminal electrically connected to a negative side of the plurality of battery cells through a negative electro conductive member,
   wherein the cell unit has a plurality of sides including a first side, a second side, and a terminal side connecting the first and second sides, the plurality of bus bars being formed on the terminal side,
   wherein the positive electro conductive member extends on the first side,
   wherein the negative electro conductive member extends on the second side,
   wherein one of the positive electro conductive member and the negative electro conductive member traverses the plurality of battery cells in the first direction, and
   wherein the first and second sides cross with each other.

2. The battery module according to claim 1, wherein the positive external terminal and the negative external terminal are arranged on the first side or the second side.

3. The battery module according to claim 1, wherein the positive electro conductive member has at least one corner portion on the first side.

4. The battery module according to claim 1, wherein the negative electro conductive member has at least one corner portion on the second side.

5. The battery module according to claim 1, further comprising a groove into which at least one of the positive electro conductive member and negative electro conductive member is fitted.

6. The battery module according to claim 1, further comprising a battery monitoring element arranged for at least one of the positive electro conductive member and negative electro conductive member.

7. The battery module according to claim 6, wherein the battery monitoring element is formed on the first side and between the first side and the positive electro conductive member.

8. The battery module according to claim 1, wherein the terminal side comprises a plurality of positive terminals and a plurality of negative terminals of the plurality of battery cells.

9. The battery module according to claim 8, wherein the plurality of bus bars connect the plurality of positive terminals and plurality of negative terminals.

10. The battery module according to claim 9, wherein the positive electro conductive member comprises:
   a first part formed on the terminal side and connected to a positive terminal of the plurality of positive terminals via a bus bar of the plurality of bus bars;
   a second part formed on the first side of the cell unit; and
   a bent part formed between the first and second parts.

11. The battery module according to claim 10, wherein the positive electro conductive member further comprises:
   a third part extending along the first side in the first direction and including a first end connected to the second part of the positive electro conductive member, and a second end connected to the positive external terminal.

12. The battery module according to claim 9, wherein the negative electro conductive member comprises:
   a first part formed on the terminal side and connected to a negative terminal of the plurality of negative terminals via a bus bar of the plurality of bus bars;
   a second part formed on the second side of the cell unit; and
   a bent part formed between the first and second parts.

13. The battery module according to claim 12, wherein the negative electro conductive member further comprises:
   a third part extending along the second side in a second direction perpendicular to the first direction, and including a first end connected to the second part of the negative electro conductive member, and a second end connected to the negative external terminal.

14. A battery module comprising:
   a cell unit including a plurality of battery cells arranged in a first direction, and comprising a first side, a second side connected to the first side, and a terminal side including a plurality of positive terminals and a plurality of negative terminals and connecting the first and second sides;
   positive and negative external terminals;
   a plurality of bus bars formed on the terminal side and connecting the plurality of positive and negative terminals;
   a positive electro conductive member connecting a positive side of the plurality of battery cells to the positive external terminal, and comprising:
      a first part formed on the terminal side and connected to a positive terminal of the plurality of positive terminals via a bus bar of the plurality of bus bars;
      a second part formed on the first side of the cell unit; and
      a bent part formed between the first and second parts of the positive electro conductive member; and
   a negative electro conductive member connecting a negative side of the plurality of battery cells to the negative external terminal, and comprising:
      a first part formed on the terminal side and connected to a negative terminal of the plurality of negative terminals via a bus bar of the plurality of bus bars;
      a second part formed on the second side of the cell unit; and
      a bent part formed between the first and second parts of the negative electro conductive member,
   wherein one of the positive electro conductive member and the negative electro conductive member traverses the plurality of battery cells in the first direction, and
   wherein the first and second sides cross with each other.

15. A battery module comprising:
   a cell unit including a plurality of battery cells arranged in a first direction;
   a plurality of bus bars;
   a positive external terminal electrically connected to a positive side of the plurality of battery cells through a positive electro conductive member; and
   a negative external terminal electrically connected to a negative side of the plurality of battery cells through a negative electro conductive member,
   wherein the cell unit has a plurality of sides including a first side, a second side, and a terminal side connecting the first and second sides, the plurality of bus bars being formed on the terminal side, wherein the positive electro conductive member extends on the first side, wherein the negative electro conductive member extends on the second side, wherein one of the positive electro conductive member and the negative electro conductive member traverses the plurality of battery cells in the first direction; and wherein the first side is connected to the second side at a corner of the cell unit.

16. The battery module according to claim 1, wherein the cell unit further comprises a first end plate formed at a first end of the cell unit, and a second end plate formed at a second end of the cell unit, and wherein the other of the positive electro conductive member and the negative electro conductive member is formed on the first end plate.

17. The battery module according to claim 16, wherein the positive and negative external terminals are formed at the first end of the cell unit.

18. The battery module according to claim 16, wherein the one of the positive electro conductive member and the negative electro conductive member extends from the first end of the cell unit to the second end of the cell unit.

* * * * *